(12) United States Patent
Chun et al.

(10) Patent No.: US 10,068,110 B2
(45) Date of Patent: Sep. 4, 2018

(54) SEMICONDUCTOR DEVICE INCLUDING A CONTENT FIREWALL UNIT THAT HAS A SECURE FUNCTION

(71) Applicant: SAMSUNG ELECTRONICS CO., LTD., Suwon-si, Gyeonggi-Do (KR)

(72) Inventors: Woo-Hyung Chun, Yongin-si (KR); Min-Je Jun, Seoul (KR); Sim-Ji Lee, Seoul (KR); Eui-Cheol Lim, Hwaseong-si (KR); Seong-Min Jo, Hwaseong-si (KR); Sung-Min Hong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 181 days.

(21) Appl. No.: 14/674,869

(22) Filed: Mar. 31, 2015

(65) Prior Publication Data

US 2016/0034216 A1 Feb. 4, 2016

Related U.S. Application Data

(60) Provisional application No. 62/032,089, filed on Oct. 29, 2014.

(30) Foreign Application Priority Data

Oct. 29, 2014 (KR) .......................... 10-2014-0148335

(51) Int. Cl.
*G06F 12/00* (2006.01)
*G06F 21/79* (2013.01)
(Continued)

(52) U.S. Cl.
CPC .............. *G06F 21/79* (2013.01); *G06F 12/14* (2013.01); *G06F 3/0622* (2013.01)

(58) Field of Classification Search
CPC ...... G06F 3/0622; G06F 3/0679; G06F 21/79; G06F 12/14; G06F 3/0644; G06F 3/0659; G06F 12/145; G06F 21/74
See application file for complete search history.

(56) References Cited

U.S. PATENT DOCUMENTS 7,124,274 B2 * 10/2006 Watt ...................... G06F 9/4812
711/163
7,203,310 B2 4/2007 England et al.
(Continued)

OTHER PUBLICATIONS

Gosain, Yashu, and Prushothaman Palanichamy. "TrustZone Technology Support in Zynq-7000 All Programmable SoCs." . Xilinx, Report (2014).*
(Continued)

*Primary Examiner* — Matthew Bradley
*Assistant Examiner* — Francisco A Grullon
(74) *Attorney, Agent, or Firm* — F. Chau & Associates, LLC

(57) ABSTRACT

A semiconductor device includes a first processing unit configured to perform a calculation by using data stored in a memory; and a memory path controller configured to communicate with the first processing unit and control the memory for the first processing unit to perform the calculation, wherein the memory path controller includes an address region control unit configured to divide an address space of the memory to include a secure address and a non-secure address and permit the first processing unit to access the secure address or the non-secure address, and a first content firewall unit connected with the address region control unit and configured to prevent the first processing unit from writing secure contents in the non-secure address.

15 Claims, 17 Drawing Sheets

(51) Int. Cl.
*G06F 12/14* (2006.01)
*G06F 3/06* (2006.01)

(56) References Cited

U.S. PATENT DOCUMENTS

| | | | | |
|---|---|---|---|---|
| 7,412,579 | B2* | 8/2008 | O'Connor | G06F 12/1441 710/107 |
| 7,444,523 | B2* | 10/2008 | Morais | G06F 21/78 713/181 |
| 7,886,098 | B2* | 2/2011 | Kershaw | G06F 12/1491 361/1 |
| 7,934,049 | B2 | 4/2011 | Holtzman et al. | |
| 8,181,237 | B2* | 5/2012 | Izatt | H04L 63/10 709/245 |
| 8,307,416 | B2* | 11/2012 | Conti | G06F 12/1483 711/100 |
| 8,719,171 | B2 | 5/2014 | Bourne et al. | |
| 8,775,757 | B2 | 7/2014 | Polzin et al. | |
| 8,930,638 | B2* | 1/2015 | Moll | G06F 12/0831 710/18 |
| 9,361,246 | B2* | 6/2016 | Park | G06F 12/145 |
| 2004/0243835 | A1* | 12/2004 | Terzis | G06F 21/6218 726/3 |
| 2006/0005072 | A1* | 1/2006 | Philippe Conti | G06F 21/82 714/5.11 |
| 2007/0220276 | A1 | 9/2007 | Croxford et al. | |
| 2007/0226795 | A1* | 9/2007 | Conti | G06F 21/74 726/22 |
| 2007/0239953 | A1* | 10/2007 | Savagaonkar | G06F 12/1483 711/163 |
| 2010/0125708 | A1* | 5/2010 | Hall | G06F 12/109 711/154 |
| 2011/0208935 | A1* | 8/2011 | Grisenthwaite | G06F 12/145 711/163 |
| 2011/0283071 | A1* | 11/2011 | Yokoya | G06F 1/3275 711/162 |
| 2012/0159184 | A1* | 6/2012 | Johnson | G06F 12/1466 713/189 |
| 2012/0191924 | A1* | 7/2012 | Iaculo | G06F 13/1673 711/154 |
| 2012/0191933 | A1* | 7/2012 | Zbiciak | G06F 13/366 711/163 |
| 2013/0205125 | A1* | 8/2013 | Grocutt | G06F 21/52 712/244 |
| 2013/0205403 | A1* | 8/2013 | Grocutt | G06F 21/52 726/27 |
| 2013/0305342 | A1 | 11/2013 | Kottilingal et al. | |
| 2013/0305388 | A1* | 11/2013 | Kottilingal | G06F 21/6218 726/28 |
| 2014/0089617 | A1* | 3/2014 | Polzin | G06F 12/14 711/163 |
| 2014/0122820 | A1* | 5/2014 | Park | G06F 12/145 711/163 |
| 2014/0122902 | A1 | 5/2014 | Isozaki et al. | |
| 2014/0123320 | A1 | 5/2014 | Isozaki et al. | |
| 2014/0149687 | A1* | 5/2014 | Moll | G06F 12/14 711/146 |
| 2014/0237609 | A1* | 8/2014 | Sharp | G06F 21/53 726/26 |
| 2014/0281319 | A1* | 9/2014 | Gupta | G06F 12/1441 711/163 |
| 2015/0052325 | A1* | 2/2015 | Persson | G06F 12/1433 711/163 |

OTHER PUBLICATIONS

"AXI Reference guide." Xilinx Inc (2011).*
"LogiCORE IP Mailbox." Xilinx, Sep. 21, 2010.*
"ARM Security Technology Building a Secure System using TrustZone Technology." ARM Limited, (2009).*

* cited by examiner

FIG. 3

| ADDRESS | STATE |
|---------|------------|
| $1000 | SECURE |
| $2000 | NON-SECURE |
| $3000 | SECURE |
| $4000 | SECURE |
| $5000 | NON-SECURE |

FIG. 4

| ADDRESS | STATE |
|---|---|
| $1000 | SECURE |
| $2000 | X |
| $3000 | SECURE |
| $4000 | SECURE |
| $5000 | X |

FIG. 8

| ADDRESS | STATE |
|---|---|
| $1000 | SECURE |
| $2000 | NON-SECURE(ENCRYPTED) |
| $3000 | SECURE |
| $4000 | SECURE |
| $5000 | X |

FIG. 12

| ADDRESS | STATE |
|---------|-------|
| $1000 | SECURE |
| $2000 | NON-SECURE(PU1-W) |
| $3000 | SECURE |
| $4000 | SECURE |
| $5000 | NON-SECURE |

FIG. 13

| ADDRESS | STATE |
|---------|--------|
| $1000 | SECURE |
| $2000 | X |
| $3000 | SECURE |
| $4000 | SECURE |
| $5000 | X |

1200

1400

SEMICONDUCTOR DEVICE INCLUDING A CONTENT FIREWALL UNIT THAT HAS A SECURE FUNCTION

CROSS-REFERENCE TO RELATED APPLICATIONS

This application claims priority under 35 U.S.C. § 119 to U.S. Patent Application No. 62/032,089, filed on Aug. 1, 2014 in the U.S. Patent and Trademark Office, and Korean Patent Application No. 10-2014-0148335 filed on Oct. 29, 2014 in the Korean Intellectual Property Office, the disclosures of which are incorporated by reference herein in their entireties.

TECHNICAL FIELD

The present inventive concept relates to a semiconductor device.

DISCUSSION OF RELATED ART

ARM® ThrustZone® is a secure hardware and software technology that provides a safe execution environment for mobile applications. The ARM® ThrustZone® provides an execution environment that allows a secure world and a normal world to be present in one central processing unit (CPU). This is done without using a separate secure hardware chip to operate a general application in the normal world and to operate a secure application in the secure world.

The ARM® ThrustZone® has an instruction set architecture (ISA) and its own cache. However, when a processing unit does not use the ARM® ThrustZone®, and when a programming register for the ISA and the cache is used, there is a possibility that secure contents will be copied to a non-secure memory region.

SUMMARY

An exemplary embodiment of the present inventive concept provides a semiconductor device including a content firewall unit that has a secure function.

In an exemplary embodiment of the present inventive concept, there is provided a semiconductor device comprising: a first processing unit configured to perform a calculation by using data stored in a memory; and a memory path controller configured to communicate with the first processing unit and control the memory for the first processing unit to perform the calculation, wherein the memory path controller includes an address region control unit configured to divide an address space of the memory to include a secure address and a non-secure address and permit the first processing unit to access the secure address or the non-secure address, and a first content firewall unit connected with the address region control unit and configured to prevent the first processing unit from writing secure contents in the non-secure address.

The first content firewall unit transmits an error message to the first processing unit in response to receiving a command to write the secure contents to the non-secure address from the first processing unit.

The error message includes information indicating that the non-secure address is not present.

The first content firewall unit receives information from the address region control unit, the information indicating whether an address of the memory in which the first processing unit intends to write the secure contents is the secure address or the non-secure address.

The memory includes a dynamic random access memory (DRAM).

The semiconductor device further comprises a memory management unit configured to convert a virtual address used by the first processing unit into a physical address.

The memory management unit is connected between the first processing unit and the first content firewall unit, and converts a command based on the virtual address received from the first processing unit into a command based on the physical address and provides the converted command to the first content firewall unit.

The semiconductor device further comprises an encryption unit configured to write the secure contents stored in the secure address in the non-secure address; and a second content firewall unit connected with the encryption unit and configured to permit the encrypted secure contents to be written in the non-secure address.

The encryption unit provides a write command to the second content firewall unit by encrypting the secure contents when the encryption unit intends to write the secure contents stored in the secure address in the non-secure address.

The address region control unit, the first and second content firewall units, and the encryption unit use the physical address.

The address region control unit permits the encryption unit to access the secure address or the non-secure address.

The semiconductor device further comprises a second processing unit; and a third content firewall unit connected with the address region control unit and configured to prevent the second processing unit from writing the secure contents in the non-secure address of the memory.

The semiconductor device further comprises an intermediate connection unit configured to connect the first to third content firewall units and the address region control unit to each other, arrange outputs of the first to third content firewall units and provide the outputs to the address region control unit.

The first processing unit includes a graphic processing unit (GPU) and the second processing unit includes a central processing unit (CPU).

The first processing unit includes a video codec and the second processing unit includes a seeker.

In an exemplary embodiment of the present inventive concept, there is provided a semiconductor device comprising: a processing unit configured to perform a calculation by using data stored in a memory; a memory path controller configured to control the memory for the processing unit to perform the calculation; an address region control unit connected with the memory path controller and configured to divide an address space of the memory to include a secure address and a non-secure address and permit the processing unit to access the secure address or the non-secure address; and a content firewall unit connected with the address region control unit and configured to prevent the processing unit from writing secure contents in the non-secure address.

In an exemplary embodiment of the present inventive concept, there is provided a semiconductor device comprising: an address region control unit configured to divide an address space of a memory to include a secure address and a non-secure address and allow a first processing unit with secure authority to access the secure address and the non-secure address and prevent a second processing unit without the secure authority from accessing the secure address; and a content firewall unit configured to receive information on the secure address and the non-secure address from the address region control unit to permit the first processing unit with the secure authority to read secure contents from the secure address and prevent the first processing unit with the secure authority from writing the secure contents read from the secure address in the non-secure address.

In an exemplary embodiment of the present inventive concept, there is provided a semiconductor device comprising: an encryption unit configured to encrypt data stored in a memory; and a memory path controller configured to communicate with the processing unit and the encryption unit and control the memory for the processing unit and the encryption unit to perform the calculation, wherein the memory path controller includes an address region control unit configured to divide an address space of the memory to include a secure address and a non-secure address and permit the processing unit and the encryption unit to access the secure address or the non-secure address, and a content firewall unit connected with the address region control unit, and configured to prevent the processing unit from writing secure contents in the non-secure address, and permit the encryption unit to write encrypted secure contents in the non-secure address.

The encryption unit provides a write command to the content firewall unit by encrypting the secure contents when the encryption unit intends to write the secure contents stored in the secure address in the non-secure address.

The encryption unit reads and encrypts the secure contents stored in the secure address and writes the encrypted secure contents in the non-secure address.

The content firewall unit transmits an error message to the processing unit in response to receiving a first command to write the secure contents in the non-secure address from the processing unit, and in response to receiving a second command to write the encrypted secure contents in the non-secure address from the encryption unit, the content firewall unit provides the second command to the address region control unit.

The semiconductor device further comprises a memory management unit configured to convert a virtual address used by the processing unit into a physical address.

The memory management unit is connected between the processing unit and the content firewall unit, and converts a command based on the virtual address received from the processing unit into a command based on the physical address and provides the converted command to the content firewall unit.

The address region control unit, the content firewall unit, and the encryption unit use the physical address.

In an exemplary embodiment of the present inventive concept, there is provided a semiconductor device comprising: a memory including a secure region and a non-secure region; a first processing unit configured to provide a write command to the memory; a second processing unit configured to provide a write or read command to the memory; and a content firewall unit connected between the second processing unit and the memory and configured to prevent the second processing unit from writing secure contents in a non-secure address of the secure region or a non-secure address of the non-secure region.

In response to the second processing unit providing a command to write the secure contents in the non-secure address of the secure region or the non-secure address of the non-secure region, the content firewall unit transmits an error message to the second processing unit.

The error message includes information indicating that the non-secure address is not present.

The memory includes a first buffer positioned in the secure region, wherein the first buffer has a secure address permitting the read and write commands and a non-secure address permitting the write command and rejecting the read command, and a second buffer positioned in the secure region, wherein the second buffer has a secure address permitting the read and write commands and a non-secure address rejecting both the read and write commands.

The first buffer includes content and a code.

The first processing unit provides the write command to the first buffer and the second processing unit provides the read or write command to the first buffer.

The second buffer includes content.

The second processing unit provides the read or write command to the second buffer.

The memory further includes a third buffer positioned in the non-secure region, and the first processing unit provides the write command to the third buffer and the second processing unit provides the read command to the third buffer.

The semiconductor device further comprises an address region control unit configured to divide an address space of the memory to include a secure address and a non-secure address and permit the second processing unit to access the secure address or the non-secure address.

The content firewall unit receives information from the address region control unit, the information indicating whether an address of the memory in which the second processing unit intends to write the secure contents is the secure address or the non-secure address.

The first processing unit includes a CPU and the second processing unit includes a GPU.

In an exemplary embodiment of the present inventive concept, there is provided a semiconductor device comprising: a processing unit configured to perform an operation on a memory; an address region control unit configured to assign addresses of the memory as a secure address or a non-secure address; and a first content firewall unit configured to prevent the processing unit from writing secure contents in the non-secure address of the memory.

The semiconductor device may further comprise a second content firewall unit configured to allow an encryption unit to write encrypted secure contents in the non-secure address of the memory.

The secure contents may include video data.

BRIEF DESCRIPTION OF THE DRAWINGS

The above and other features of the present inventive concept will become more apparent by describing in detail exemplary embodiments thereof with reference to the attached drawings in which:

FIG. 3 is a diagram for describing a function of an address region control unit of FIG. 2, according to an exemplary embodiment of the present inventive concept;

FIG. 4 is a diagram for describing a function of a content firewall unit of FIG. 2, according to an exemplary embodiment of the present inventive concept;

FIG. 8 is a diagram for describing functions of a third content firewall unit and an encryption unit of FIG. 7, according to an exemplary embodiment of the present inventive concept;

FIGS. 12 and 13 are diagrams for describing functions of first to fourth buffers and a content firewall unit of FIG. 11, according to an exemplary embodiment of the present inventive concept;

DETAILED DESCRIPTION OF THE EMBODIMENTS

Figure 1:
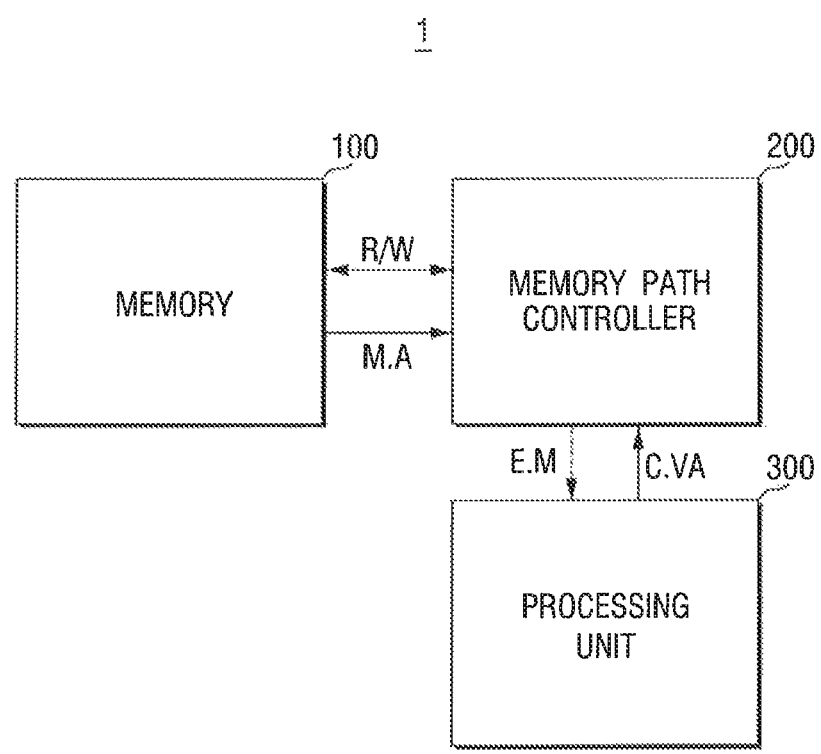
FIG. 1 is a block diagram of a semiconductor device according to an exemplary embodiment of the present inventive concept.

Exemplary embodiments of the present inventive concept will now be described more fully hereinafter with reference to the accompanying drawings. The present inventive concept may, however, be embodied in many different forms and should not be construed as being limited to the embodiments set forth herein. Like reference numerals may refer to like elements throughout the specification and drawings.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from an implanted to a non-implanted region. In addition, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Hereinafter, a semiconductor device according to an exemplary embodiment of the present inventive concept will be described with reference to FIGS. 1 to 4.

Figure 2:
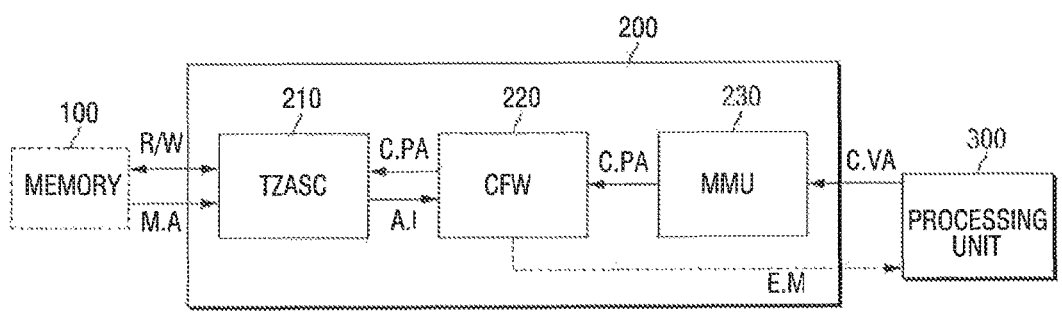
FIG. 2 is a diagram illustrating a memory path controller of FIG. 1, according to an exemplary embodiment of the present inventive concept.

FIG. 1 is a block diagram of a semiconductor device according to an exemplary embodiment of the present inventive concept. FIG. 2 is a diagram illustrating a memory path controller of FIG. 1, according to an exemplary embodiment of the present inventive concept. FIG. 3 is a diagram for describing a function of an address region control unit of FIG. 2, according to an exemplary embodiment of the present inventive concept. FIG. 4 is a diagram for describing a function of a content firewall unit of FIG. 2, according to an exemplary embodiment of the present inventive concept.

Referring to FIG. 1, the semiconductor device 1 according to the current embodiment may include a memory 100, a memory path controller 200, and a processing unit 300.

The memory 100 may include, for example, a dynamic random access memory (DRAM), but is not limited thereto. Further, the memory 100 may be connected with the memory path controller 200 and controlled by the memory path controller 200.

The memory 100 provides information (M.A) on a memory address to the memory path controller 200. A detailed description thereof will be provided below.

The memory path controller 200 may communicate with the processing unit 300 and control the memory 100 for the processing unit 300 to perform a calculation.

In detail, the memory path controller 200 may receive a command (C.VA) from the processing unit 300 and provide an error message (E.M) to the processing unit 300. Further, the memory path controller 200 may perform a write or a read operation (R/W) in the memory 100 based on the command (C.VA) received from the processing unit 300.

The memory path controller 200 may receive the information (M.A) on the memory address from the memory 100.

A more detailed description of the memory path controller 200 will be made in reference to FIG. 2.

The processing unit 300 may perform the calculation by using data stored in the memory 100.

In detail, the processing unit 300 may receive the error message (E.M) from the memory path controller 200 and provide the command (C.VA) to the memory path controller 200. The command (C.VA) may be, for example, a command to read the data stored in the memory 100 or write the data in the memory 100. Further, the data may include, for example, contents, but is not limited thereto.

The processing unit 300 uses a virtual address, and as a result, the command (C.VA) may also be given based on the virtual address. In addition, the processing unit 300 receives the error message (E.M) from a content firewall unit 220 of FIG. 2. A detailed description thereof will be made below.

Additionally, the processing unit 300 may be, for example, a central processing unit (CPU), a graphic processing unit (GPU), a video codec, and the like, but is not limited thereto.

Referring to FIG. 2, the memory path controller 200 may include an address region control unit 210, the content firewall unit 220, and a memory management unit 230.

The address region control unit 210 divides an address of the memory 100 into a secure address and a non-secure address and may permit the processing unit 300 to access the secure address or the non-secure address. In other words, the address region control unit 210 may permit a processing unit having a secure authority to access the secure address and the non-secure address and prevent a processing unit having a non-secure authority from accessing the secure address. Herein, dividing an address of a memory may mean to divide an address space of the memory to include, for example, a secure address and a non-secure address. Dividing an address of a memory may also mean to assign certain memory addresses as secure or non-secure, for example.

In detail, the address region control unit 210 receives a command (C.PA) based on a physical address from the content firewall unit 220 to write the data in the memory 100 or read the data stored in the memory 100. Further, the address region control unit 210 may provide to the content firewall unit 220 information (A.I) indicating whether the address of the memory 100 which the processing unit 300 intends to write or read the data to or from is the secure address or the non-secure address.

The address region control unit 210 receives information (M.A) on the memory address from the memory 100 to generate the information (A.I) indicating whether the address of the memory 100 which the processing unit 300 intends to write or read the data in or from is the secure address or the non-secure address.

The content firewall unit 220 may be connected with the address region control unit 210 and prevent the processing unit 300 from writing secure contents in the non-secure address. In other words, the content firewall unit 220 may permit the processing unit 300 having the secure authority to read the secure contents written in the secure address and prevent the processing unit 300 having the secure authority from writing the secure contents read from the secure address in the non-secure address.

In addition, the content firewall unit 220 may also prevent the processing unit 300 from reading the secure contents written in the non-secure address. However, for ease of description, it will be hereafter described that the content firewall unit 220 serves to prevent the processing unit 300 from writing the secure contents in the non-secure address.

In detail, the content firewall unit 220 may be connected between the address region control unit 210 and the memory management unit 230. Further, the content firewall unit 220 may receive the command (C.PA) based on the physical address from the memory management unit 230 and receive from the address region control unit 210 the information (A.I) indicating whether the address of the memory 100 which the processing unit 300 intends to write or read the data in or from is the secure address or the non-secure address.

The content firewall unit 220 may transmit the error message E.M to the processing unit 300 when the command C.PA received from the memory management unit 230 is the command to write the secure contents in the non-secure address.

Herein, the error message E.M may include information indicating the non-secure address is not present. In more detail, the error message E.M may be, for example, a decoding error message, but is not limited thereto.

The content firewall unit 220 may provide to the address region control unit 210 the command C.PA received from the memory management unit 230 when the command C.PA received from the memory management unit 230 is not the command to write the secure contents in the non-secure address.

The memory management unit 230 may convert the virtual address used by the processing unit 300 into the physical address.

In detail, the memory management unit 230 may be connected between the processing unit 300 and the content firewall unit 220 and convert the virtual address used by the processing unit 300 into the physical address to provide the physical address to the content firewall unit 220.

In other words, the memory management unit 230 converts the command C.VA based on the virtual address received from the processing unit 300 into the command C.PA based on the physical address to provide the command C.PA to the content firewall unit 220. Therefore, the memory 100 may be efficiently managed and protected and a cache may also be efficiently managed.

In summary, the processing unit 300 uses the virtual address and the virtual address is converted into the physical address through the memory management unit 230, and as a result, the physical address may also be used in the content firewall unit 220 and the address region control unit 210.

Referring to FIG. 3, a table is illustrated in which the address of the memory 100 is divided into the secure address and the non-secure address by the address region control unit 210.

In detail, the address region control unit 210 may divide the address of the memory 100 into two types, in other words, the secure address and the non-secure address. Further, whether the physical address of the command C.PA provided by the memory management unit 230 based on the command C.VA provided by the processing unit 300 corresponds to the secure address or the non-secure address may be determined through the address region control unit 210.

For example, when the address of the memory 100 includes street addresses 1000 to 5000 $1000 to $5000, the street addresses 1000 to 5000 $1000 to $5000 may be the secure address (1000 $1000), the non-secure address (2000 $2000), the secure address (3000 $3000), the secure address (4000 $4000), and the non-secure address (5000 $5000), respectively. It is to be understood that whether the address of the memory 100 is the secure address or the non-secure address depending on the respective street addresses illustrated in FIG. 3 is not limited thereto.

Referring to FIG. 4, when the processing unit 300 provides the command to write the secure contents in the non-secure address to the content firewall unit 220, how the content firewall unit 220 shows the address of the memory 100 to the processing unit 300 is illustrated.

In detail, when the content firewall unit 220 receives the command to write the secure contents to the non-secure address, the content firewall unit 220 may transmit to the processing unit 300 the error message E.M indicating that the address (for example, the street addresses 2000 and 5000 $2000 and $5000) of the memory 100 corresponding to the non-secure address is not present.

For example, when the processing unit 300 reads the secure contents stored in the street address 1000 $1000 and stores the read secure contents in a register and provides to the content firewall unit 220 the command to write the secure contents stored in the register in the street address 2000 $2000, the content firewall unit 220 may provide to the processing unit 300 the error message E.M indicating that the street address 2000 $2000 is not present.

In other words, since the content firewall unit 220 prevents the secure contents from being written in the non-secure address, the secure contents are not stored in the non-secure address, and as a result, the secure contents may be prevented from being copied by another processing unit having non-secure authority.

The semiconductor device 1 according to the current embodiment includes the content firewall unit 220 having a secure function. In the case that the processing unit 300 sends a command to write secure contents in a non-secure address, the content firewall unit 220 transmits the error message E.M to the processing unit 300 indicating that the address of the memory 100 corresponding to the non-secure address is not present, thereby preventing the secure contents from being copied to the non-secure address. Therefore, the current embodiment has a secure function.

Hereinafter, a semiconductor device according to an exemplary embodiment of the present inventive concept will be described with reference to FIG. 5. A difference from the aforementioned embodiment will be primarily described.

Figure 5:
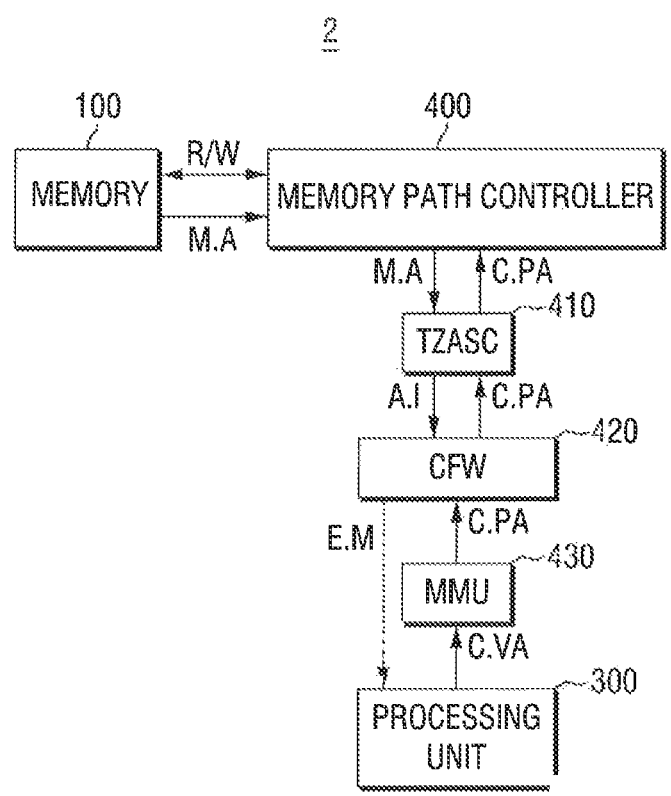
FIG. 5 is a block diagram of a semiconductor device according to an exemplary embodiment of the present inventive concept.

FIG. 5 is a block diagram of a semiconductor device according to an exemplary embodiment of the present inventive concept.

Referring to FIG. 5, the semiconductor device 2 according to the current embodiment may include a memory 100, a processing unit 300, a memory path controller 400, an address region control unit 410, a content firewall unit 420, and a memory management unit 430.

In the semiconductor device 2 of FIG. 5, the address region control unit 410, the content firewall unit 420, and the memory management unit 430 are positioned outside the memory path controller 400 unlike the semiconductor device 1 of FIG. 1.

First, the memory 100 may provide the information M.A on the memory address to the memory path controller 400 and the memory path controller 400 may perform the write or read operation (R/W) in or from the memory 100.

Subsequently, the address region control unit 410 may be connected between the memory path controller 400 and the content firewall unit 420, and receive the command C.PA based on the physical address from the content firewall unit 420 and provide the received command to the memory path controller 400.

The address region control unit 410 may generate the information (A.I) indicating whether the address of the memory 100 which the processing unit 300 intends to write or read the data in or from is the secure address or the non-secure address based on information (M.A) on the memory address received from the memory path controller 400.

Additionally, the address region control unit 410, the content firewall unit 420, and the memory management unit 430 may be positioned between the processing unit 300 and the memory path controller 400.

In other words, it can be seen that the address region control unit 410, the content firewall unit 420, and the memory management unit 430 may be positioned outside the memory path controller 400 in the semiconductor device 2. However, the present inventive concept is not limited thereto. For example, one or two of the address region control unit 410, the content firewall unit 420, and the memory management unit 430 may be included in the memory path controller 400 and the residual components may be positioned outside the memory path controller 400.

Hereinafter, a semiconductor device according to an exemplary embodiment of the present inventive concept will be described with reference to FIGS. 6 to 8. A difference from the aforementioned embodiments will be primarily described.

Figure 6:
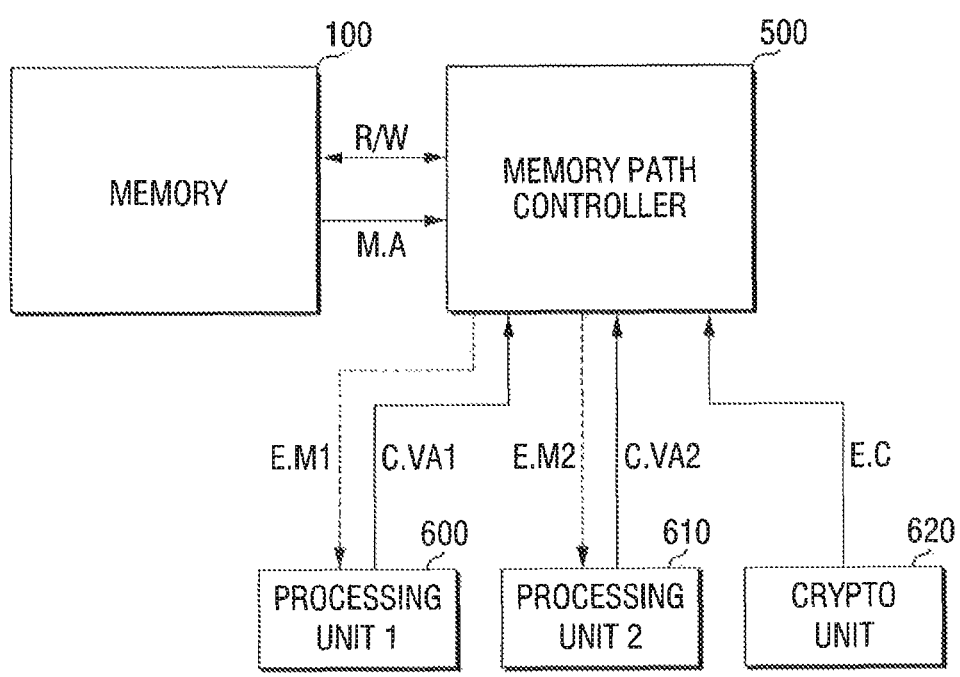
FIG. 6 is a block diagram of a semiconductor device according to an exemplary embodiment of the present inventive concept.

FIG. 6 is a block diagram of a semiconductor device according to an exemplary embodiment of the present inventive concept. FIG. 7 is a diagram illustrating a memory path controller of FIG. 6, according to an exemplary embodiment of the present inventive concept. FIG. 8 is a diagram for describing a function of a third content firewall unit of FIG. 7, according to an exemplary embodiment of the present inventive concept.

Referring to FIG. 6, the semiconductor device 3 according to the current embodiment may include a memory 100, a memory path controller 500, first and second processing units 600 and 610, and an encryption unit 620.

The first and second processing units 600 and 610 perform substantially the same operation as the processing unit 300 described in FIG. 2 above. In FIG. 6, the error message provided to the first processing unit 600 is denoted as E.M1, the command provided by the first processing unit 600 is denoted as C.VA1, the error message provided to the second processing unit 610 is denoted as E.M2, and the command provided by the second processing unit 610 is denoted as C.VA2. Herein, the semiconductor device 3 includes two processing units 600 and 610, in other words, the first and second processing units 600 and 610, but is not limited thereto. For example, the semiconductor device 3 may include one or more than two processing units.

In addition, the semiconductor device 3 of FIG. 6 may further include the encryption unit 620 unlike the semiconductor device 1 of FIG. 2. Herein, the encryption unit 620 may be used to write the secure contents stored in the secure address of the memory 100 in the non-secure address. In FIGS. 6-8, E.C may denote an encrypted command.

Figure 7:
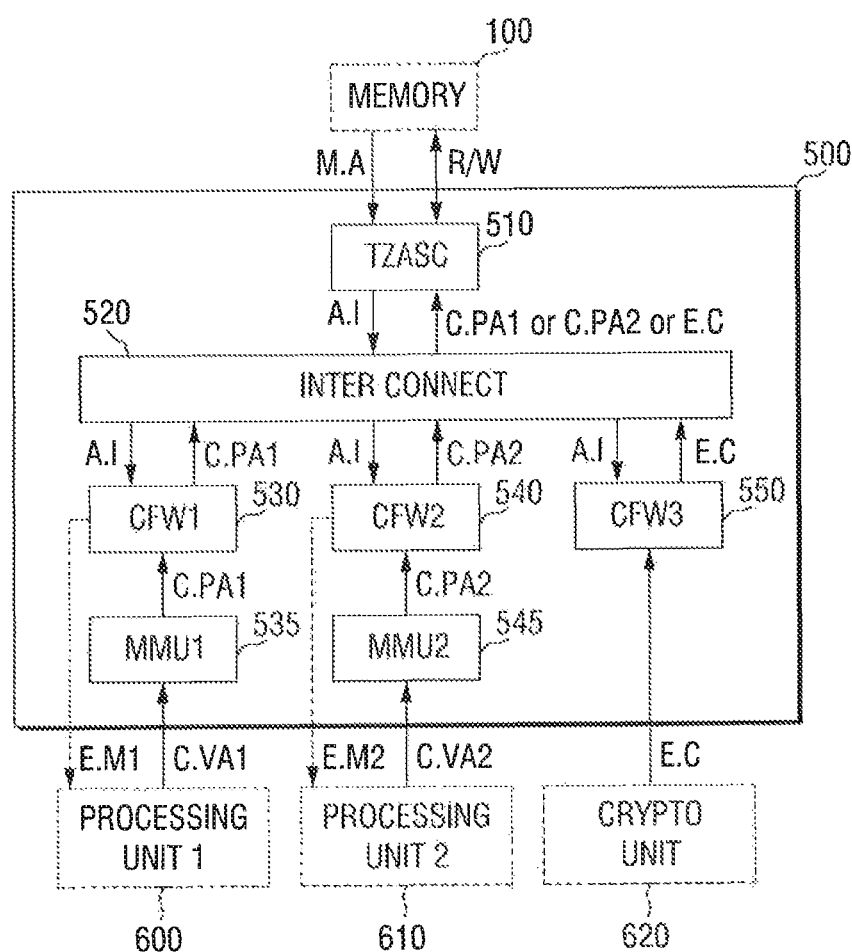
FIG. 7 is a diagram illustrating a memory path controller of FIG. 6, according to an exemplary embodiment of the present inventive concept.

In detail, referring to FIG. 7, a third content firewall unit 550 connected with the encryption unit 620 and first and second content firewall units 530 and 540 connected with the first and second processing units 600 and 610 perform different roles.

In other words, the first and second content firewall units 530 and 540 may perform the same role as the content firewall unit 220 of FIG. 2 described above. In other words, the first and second content firewall unit 530 and 540 may prevent the first and second processing units 600 and 610 from writing the secure contents in the non-secure address of the memory 100, respectively.

Herein, the first processing unit 600 and the second processing unit 610 may be different processing units. In other words, the first processing unit 600 may be, for example, a GPU and the second processing unit 610 may be, for example, a CPU. Further, the first processing unit 600 may be, for example, a video codec and the second processing unit 610 may be, for example, a seeker, but the present inventive concept is not limited thereto.

Further, the third content firewall unit 550 may permit the encrypted secure contents to be written in the non-secure address.

In detail, the encryption unit 620 may provide the write command to the third content firewall unit 550 by encrypting the secure contents when the encryption unit 620 intends to write the secure contents stored in the secure address of the memory 100 in the non-secure address.

In other words, the encryption unit 620 may read and encrypt the secure contents stored in the secure address of the memory 100 and write the encrypted secure contents in the non-secure address of the memory 100. Although the third content firewall unit 550 also receives the command to write the secure contents in the non-secure address, the third content firewall unit 550 does not unconditionally generate the error message for the command. For example, only when receiving the command to write the encrypted secure contents, does the third content firewall unit 550 permit the secure contents to be written in the non-secure address.

Unlike the semiconductor device 1 of FIG. 2, the semiconductor device 3 of the current embodiment includes the first to third content firewall units 530 to 550, and as a result, the semiconductor device 3 may further include an intermediate connection unit 520 for connecting the first to third content firewall units 530, 540, and 550 and an address region control unit 510 to each other.

The intermediate connection unit 520 may connect the first to third content firewall units 530, 540, and 550 and the address region control unit 510, and arrange outputs of the first to third content firewall units 530, 540, and 550 and provide the arranged outputs to the address region control unit 510.

In other words, the intermediate connection unit 520 arranges a first command C.PA1 received from the first content firewall unit 530, a second command C.PA2 received from the second content firewall unit 540, and an encrypted command E.C received from the third content firewall unit 550 not to be mixed to provide the arranged command to the address region control unit 510.

Referring to FIG. 8, the secure contents encrypted by the encryption unit 620 are written in the non-secure address.

In detail, for example, when the encryption unit 620 reads the secure contents stored in street address 1000 $1000 and stores the read secure contents in a register, the encryption unit 620 encrypts the secure contents stored in the register, and provides a command to write the encrypted secure contents in the street address 2000 $2000 in the third content firewall unit 550, the third content firewall unit 550 may permit the encrypted secure contents to be written in the street address 2000 $2000.

In other words, when the third content firewall unit 550 receives the command to write the encrypted secure contents among the secure contents in the non-secure address, the third content firewall unit 550 may permit the encrypted secure contents to be written in the non-secure address. As a result, the encrypted secure contents may be written in the street address 2000 $2000 (NON-SECURE(ENCRYPTED)) which is the non-secure address.

For example, even when the semiconductor device 3 needs to write the secure contents in the non-secure address (for example, it needs to transfer the secure contents such as digital rights management (DRM) contents to an external display through a WiFi interface), the semiconductor device 3 may stably perform the operation by using the third content firewall unit 550 and the encryption unit 620. In other words, in the semiconductor device 3, the secure contents are encrypted and written in the non-secure address to prevent the written secure contents from being copied by another processing unit having no secure authority.

Additionally, the semiconductor device 3 of FIGS. 6 and 7 includes the address region control unit 510, the intermediate connection unit 520, the first to third content firewall units 530, 540, and 550, and first and second memory management units 535 and 545 in the memory path controller 500, but is not limited thereto. In other words, like the semiconductor device 2 illustrated in FIG. 5, the address region control unit 510, the intermediate connection unit 520, the first to third content firewall units 530, 540, and 550, and the first and second memory management units 535 and 545 may be positioned outside the memory path controller 500 and one or more of these units may be positioned in the memory path controller 500 and the residual units may be positioned outside the memory path controller 500.

Hereinafter, a semiconductor device according to an exemplary embodiment of the present inventive concept will be described with reference to FIG. 9. A difference from the embodiment of FIGS. 6 to 8 will be mainly described.

Figure 9:
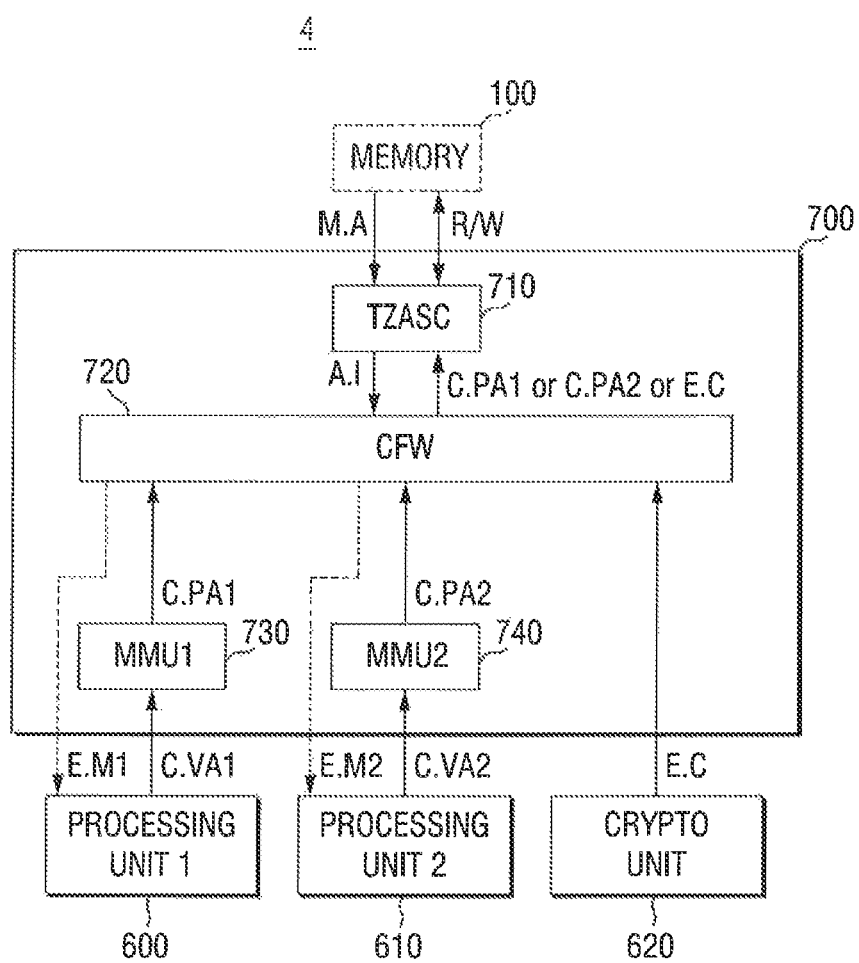
FIG. 9 is a block diagram of a semiconductor device according to an exemplary embodiment of the present inventive concept.

FIG. 9 is a block diagram of a semiconductor device according to an exemplary embodiment of the present inventive concept.

Referring to FIG. 9, a semiconductor device 4 has first and second processing units 600 and 610, and an encryption unit 620 communicating with a single content firewall unit 720, unlike the semiconductor device 3 of FIG. 6.

In other words, in the semiconductor device 4 of FIG. 9, the content firewall unit 720 that handles a secure command for respective read/write commands from the first and second processing units 600 and 610 and the encryption unit 620 is one unit, unlike the semiconductor device 3 of FIG. 6 which has three.

Accordingly, the content firewall unit 720 of the semiconductor device 4 receives first and second commands C.PA1 and C.PA2 from first and second memory management units 730 and 740 which are connected with the first and second processing units 600 and 610, respectively, and receives an encrypted command E.C from the encryption unit 620 to perform substantially the same function as the first to third content firewall units 530 to 550 of FIG. 7.

In other words, when the content firewall unit 720 receives the command to write the secure content to the non-secure address of the memory 100 from the first processing unit 600, the content firewall unit 720 may provide a first error message E.M1 to the first processing unit 600. Further, when the content firewall unit 720 receives the command to write the secure content in the non-secure address of the memory 100 from the second processing unit 610, the content firewall unit 720 may provide a second error message E.M2 to the second processing unit 610. In addition, when the content firewall unit 720 receives the command to write the encrypted secure content in the non-secure address of the memory 100 from the encryption unit 620, the content firewall unit 720 permits the encrypted secure content to be written in the non-secure address.

The content firewall unit 720 arranges the first command C.PA1 received from the first memory management unit 730, the second command C.PA2 received from the second memory management unit 740, and the encrypted command E.C received from the encryption unit 620 so as not to be mixed to provide the arranged commands to the address region control unit 710.

As a result, the content firewall unit 720 of FIG. 9 may serve as both the first to third content firewall units 530, 540, and 550 and the intermediate connection unit 520 of FIG. 7.

Additionally, the semiconductor device 4 of FIG. 9 is illustrated to include the address region control unit 710, the content firewall unit 720, and the first and second memory management units 730 and 740 in memory path controller 700, but is not limited thereto. In other words, like the semiconductor device 2 illustrated in FIG. 5, the address region control unit 710, the content firewall unit 720, and the first and second memory management units 730 and 740 may be positioned outside the memory path controller 700, and one or more of these units may be positioned inside the memory path controller 700 and the remaining units may be positioned outside the memory path controller 700.

Hereinafter, a semiconductor device according to an exemplary embodiment of the present inventive concept will be described with reference to FIGS. 10 to 13. A difference from the above embodiments will be mainly described.

Figure 10:
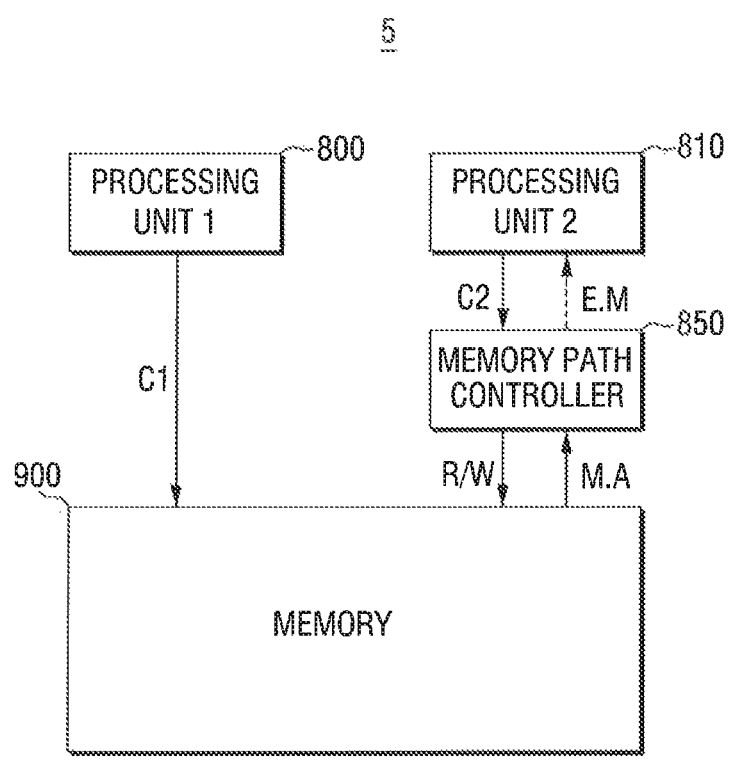
FIG. 10 is a block diagram of a semiconductor device according to an exemplary embodiment of the present inventive concept.
Figure 11:
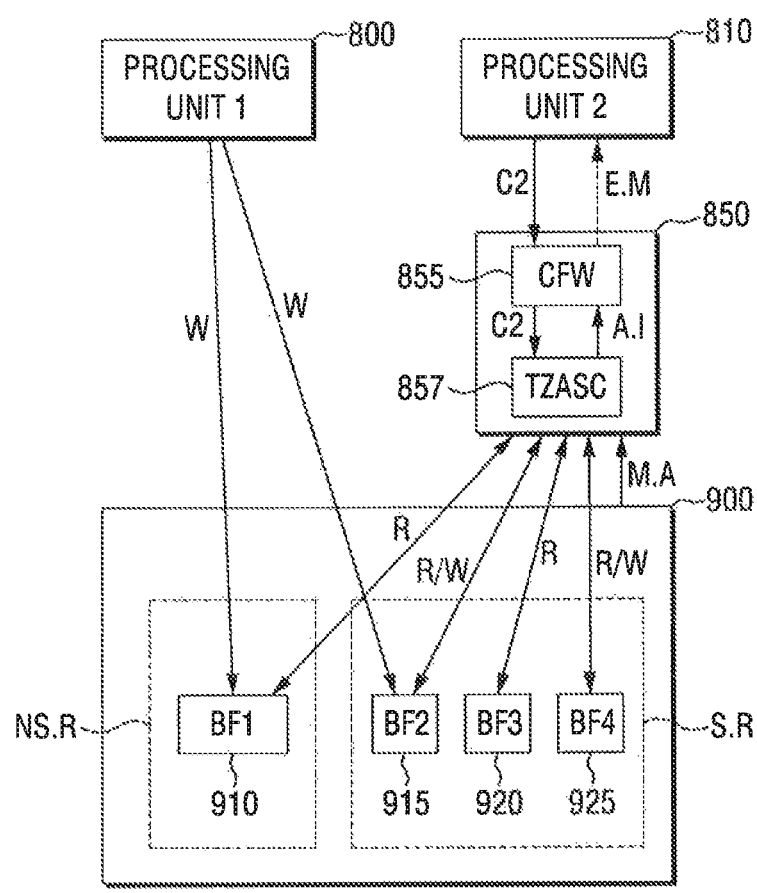
FIG. 11 is a diagram illustrating a memory path controller and a memory of FIG. 10, according to an exemplary embodiment of the present inventive concept.

FIG. 10 is a block diagram of a semiconductor device according to an exemplary embodiment of the present inventive concept. FIG. 11 is a diagram of a memory path controller and a memory of FIG. 10, according to an exemplary embodiment of the present inventive concept. FIGS. 12 and 13 are diagrams for describing functions of first to fourth buffers and the content firewall unit of FIG. 11, according to an exemplary embodiment of the present inventive concept.

Referring to FIG. 10, a semiconductor device 5 of an exemplary embodiment of the present inventive concept may include a memory 900, first and second processing units 800 and 810, and a memory path controller 850.

Unlike the semiconductor devices 1 to 4 described above, in the semiconductor device 5 of FIG. 10, a direct read or write operation between the processing units 800 and 810 and the memory 900 is performed, and secure functions performed by each of buffers in the memory 900 are different from each other.

The first processing unit 800 provides a first command C1 to the memory 900, and the second processing unit 810 may provide a second command C2 to the memory 900. Herein, the first command C1 may be a write command and the second command C2 may be a read or write command, but they are not limited thereto.

In detail, referring to FIG. 11, the memory 900 may include a secure region S.R and a non-secure region NS.R.

Herein, the secure region S.R may be a region in which a buffer capable of performing the secure function by itself among the buffers in the memory 900 is included, and the non-secure region NS.R may be a region in which a buffer incapable of performing the secure function by itself among the buffers in the memory 900 is included.

The memory 900 may include first to fourth buffers 910, 915, 920, and 925.

First, the first buffer 910 is positioned in the non-secure region NS.R and may receive a write command W from the first processing unit 800 and receive a read command R from the second processing unit 810.

The second buffer 915 is positioned in the secure region S.R and may have a secure address permitting both the read and write commands and a non-secure address permitting the write command and rejecting the read command. The second buffer 915 may receive the write command W from the first processing unit 800 and receive the read/write command R/W from the second processing unit 810.

The third buffer 920 is positioned in the secure region S.R and may have a secure address permitting both the read and write commands and a non-secure address rejecting both the read and write commands. The third buffer 920 may receive the read command R from the second processing unit 810.

The fourth buffer 925 is positioned in the secure region S.R and may have a secure address permitting both the read and write commands and a non-secure address rejecting both the read and write commands. The fourth buffer 925 may receive the read/write commands R/W from the second processing unit 810.

The first processing unit 800 may provide the write command W to the memory 900 and for example, may include a CPU, but is not limited thereto.

The second processing unit 810 may provide the read/write command R/W to the memory 900 and include a different processing unit from the first processing unit 800. In other words, the second processing unit 810 may include, for example, a GPU, but is not limited thereto.

The memory path controller 850 is connected between the second processing unit 810 and the memory 900 and may include a content firewall unit 855 and an address region control unit 857.

The content firewall unit 855 is connected between the second processing unit 810 and the memory 900 and may prevent the second processing unit 810 from writing the secure contents in the non-secure address of the secure region S.R or the non-secure address of the non-secure region NS.R. In other words, the content firewall unit 855 may provide the error message E.M to the second processing unit 810 when the second command C2 is a command to write the secure contents to the non-secure address of the secure region S.R or the non-secure address of the non-secure region NS.R.

The content firewall unit 855 may receive from the address region control unit 857 information A.I indicating whether an address of the memory 900 where the second processing unit 810 is to write the secure contents is the secure address or the non-secure address.

Herein, a memory management unit such as one described above may be positioned between the second processing unit 810 and the content firewall unit 855.

The address region control unit 857 divides the address of the memory 900 into the secure address and the non-secure address and may permit the second processing unit 810 to access the secure-address or the non-secure address.

The address region control unit 857 may receive information M.A regarding the memory address from the memory 900.

Referring to FIGS. 12 and 13, it can be seen that the secure contents are prevented from being written to the non-secure address of the memory 900 by the first to fourth buffers 910, 915, 920, and 925 and the content firewall unit 855.

In detail, unlike the second to fourth buffers 915, 920, and 925, since the first buffer 910 is positioned in the non-secure region NS.R, the first buffer 910 does not have a self-secure function.

Accordingly, when the first processing unit 800 writes the secure contents in the street address 2000 $2000 which is the non-secure address of the first buffer 910, the first buffer 910 may not prevent the secure contents from being written (in other words, as illustrated in FIG. 12, a write command PU1-W of the secure contents is performed in the non-secure address by the first processing unit 800). However, since the first processing unit 800 provides only the write command but does not provide the read command, the first processing unit 800 is not a concern. Further, even though the second processing unit 810 reads the secure contents written in the street address 2000 $2000 which is the non-secure address, since the content firewall unit 855 prevents the secure contents from being read, the second processing unit 810 is not a concern (in other words, as illustrated in FIG. 13, the content firewall unit 855 responds by indicating that the street addresses 2000 and 5000 $2000 and $5000, which are non-secure addresses, are a non-existing address to the second processing unit 810.

In other words, the first buffer 910 existing in the non-secure region NS.R may be protected due to the fact that the first processing unit 800 performs only the write command and the second processing unit 810 is prevented from reading the written secure content in the non-secure address by the content firewall unit 855.

Next, the second buffer 915 may include both the contents and the code, be positioned in the secure region S.R, and have the self-secure function.

Accordingly, when the first processing unit 800 writes the secure contents in the street address 2000 $2000 which is the non-secure address of the second buffer 915, the second buffer 915 may not prevent the secure contents from being written (in other words, as illustrated in FIG. 12, the write command PU1-W of the secure contents is performed in the non-secure address by the first processing unit 800). However, since the first processing unit 800 provides only the write command but does not provide the read command, the first processing unit 800 is not a concern. In addition, since the second buffer 915 itself rejects the read command for the non-secure address, the first processing unit 800 is not a concern. Further, even though the second processing unit 810 provides the command to read the secure contents written in the street address 2000 $2000, which is the non-secure address, since the second buffer 915 itself rejects the read command for the non-secure address, the second processing unit 810 is not a concern regardless of the content firewall unit 855. In other words, as illustrated in FIG. 12, even though the street address 2000 $2000, which is the non-secure address, is recognized by the second processing unit 810, since the second buffer 915 itself rejects the read command for the non-secure address, the second processing unit 810 may not give the read command to the street addresses 2000 and 50000 $2000 to $5000.

Subsequently, the third buffer 920 may include contents, and may be positioned in the secure region S.R and have the secure function in itself.

In detail, since the third buffer 920 rejects both the read and write commands from and in the non-secure address of the third buffer 920, there is no concern that the secure contents will be written in the non-secure address, and as a result, there is also no concern that the secure contents stored in the non-secure address will be read.

Therefore, although the second processing unit 810 provides the read command for the non-secure address of the third buffer 920, the read command itself may be rejected regardless of the content firewall unit 855.

Last, the fourth buffer 925 may include the contents, and may be positioned in the secure region S.R and have the secure function in itself.

In detail, since the fourth buffer 925 rejects both the read and write commands from and in the non-secure address of the fourth buffer 925, there is no concern that the secure contents will be written in the non-secure address, and as a result, there is also no concern that the secure contents stored in the non-secure address will be read.

Therefore, although the second processing unit 810 provides the read/write command for the non-secure address of the fourth buffer 925, the read/write command itself may be rejected regardless of the content firewall unit 855.

In summary, the semiconductor device 5 performs the secure function by using the content firewall unit 855 with respect to the non-secure region NS.R of the memory 900 and performs the self secure function with respect to the secure region S.R of the memory 900 to have a secure function.

Figure 14:
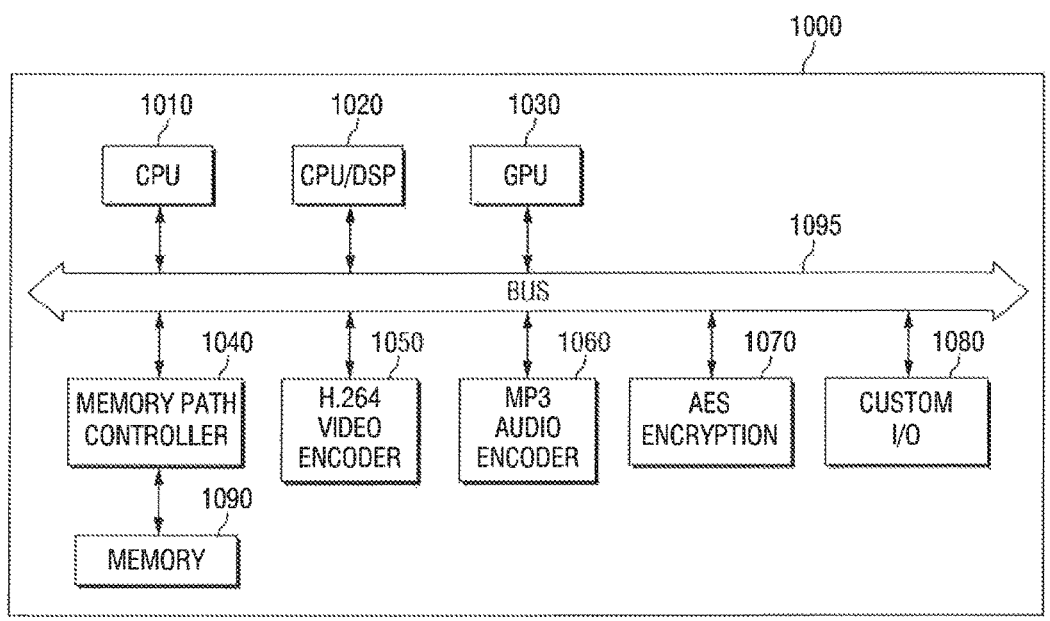
FIG. 14 is a block diagram of a computing device adopting a semiconductor device according to an exemplary embodiment of the present inventive concept.

Hereinafter, a computing device 1000 adopting a semiconductor device according to an exemplary embodiment of the present inventive concept will be described with reference to FIG. 14.

The computing device 1000 may include a CPU 1010, a CPU/digital signal processor (DSP) 1020, a GPU 1030, a memory path controller 1040, an H.264 video encoder 1050, a moving pictures expert group layer-3 (MP3) audio encoder 1060, an advanced encryption standard (AES) encryption 1070, a custom input/output 1080, a memory 1090, and a bus 1095. The CPU 1010, the CPU/DSP 1020, the GPU 1030, the memory path controller 1040, the H.264 video encoder 1050, the MP3 audio encoder 1060, the AES encryption 1070, and the custom input/output 1080 may communicate with each other through the bus 1095. The memory path controller 1040 may control the memory 1090 in accordance with an exemplary embodiment of the inventive concept described above. In an exemplary embodiment of the inventive concept, the computing device 1000 may include a personal computer, a desktop computer, a laptop computer, a computer workstation, a video game platform/console, a wireless communication device, a handheld device, a television, a server, a network device, a main frame computer, and other devices for processing or displaying graphic data, but is not limited thereto.

Figure 15:
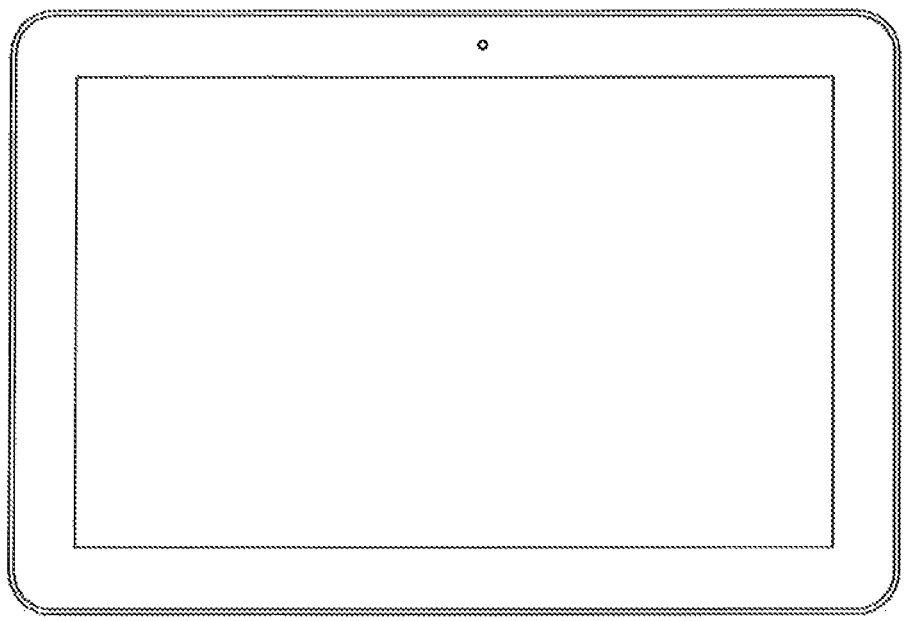
FIGS. 15 to 17 illustrate exemplary semiconductor systems to which semiconductor devices according to exemplary embodiments of the present inventive concept can be applied.
Figure 16:
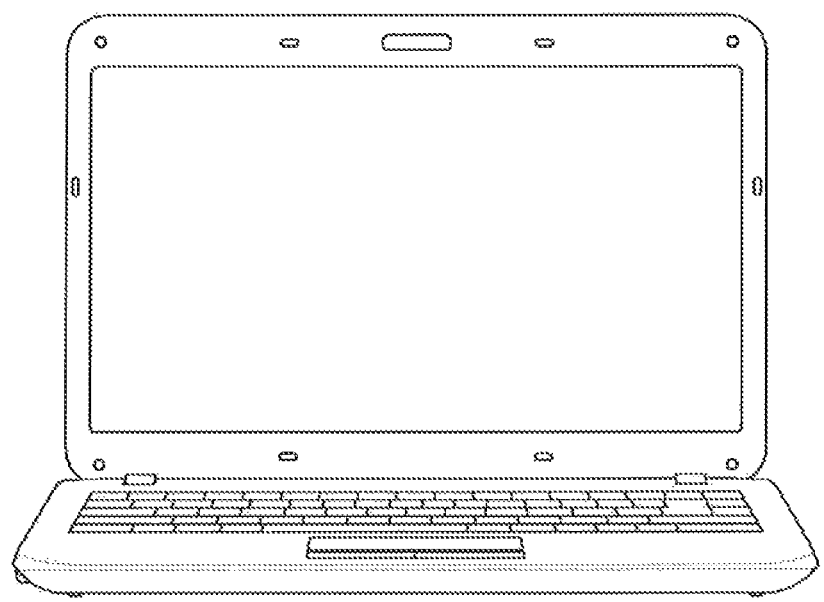
Figure 17:
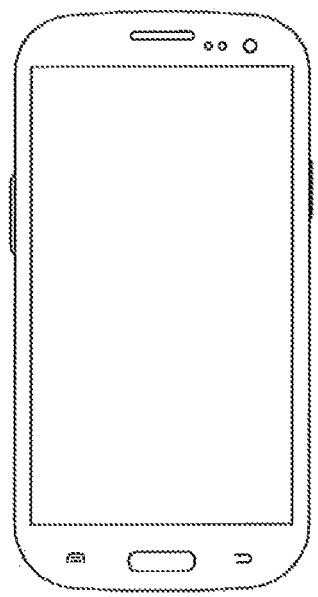

FIGS. 15 to 17 illustrate exemplary semiconductor systems to which semiconductor devices according to exemplary embodiments of the present inventive concept can be applied.

FIG. 15 is a diagram illustrating a tablet PC 1200 and FIG. 16 is a diagram illustrating a notebook computer 1300. FIG. 17 illustrates a smart phone 1400. The semiconductor devices 1 to 5 according to exemplary embodiments of the present inventive concept may be used in the table PC 1200, the notebook computer 1300, and the smart phone 1400.

It should be apparent to those skilled in the art that the semiconductor devices 1 to 5 according to exemplary embodiments of the present inventive concept may be applied to other integrated circuit devices which are not illustrated. In other words, although the semiconductor systems which include only the tablet PC 1200, the notebook computer 1300, and the smart phone 1400 are shown, the application of the semiconductor devices according to the exemplary embodiments of the present inventive concept is not limited thereto. Further, in exemplary embodiments of the present inventive concept, the semiconductor system may be implemented by a computer, an ultra mobile PC (UMPC), a workstation, a net-book, a personal digital assistant (PDA), a portable computer, a wireless phone, a mobile phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, and the like.

While the present inventive concept has been particularly shown and described with reference to exemplary embodiments thereof, it will be understood by those of ordinary skill in the art that various changes in form and detail may be made therein without departing from the spirit and scope of the present inventive concept as defined by the following claims.

What is claimed is:

1. A semiconductor device, comprising:
    a first processing unit configured to perform a calculation by using data stored in a memory; and
    a memory path controller configured to communicate with the first processing unit and control the memory for the first processing unit to perform the calculation,
    wherein the memory path controller includes:
    an address region control unit configured to divide an address space of the memory to include a secure address and a non-secure address and permit the first processing unit to access the secure address or the non-secure address, and
    a first content firewall unit connected with the address region control unit and configured to prevent the first processing unit from writing secure contents in the non-secure address when a command to write the secure contents to the non-secure address is received from the first processing unit, and prevent the first processing unit from reading secure contents written in the non-secure address,
    wherein the first content firewall unit transmits an error message to the first processing unit in response to receiving the command to write the secure contents to the non-secure address from the first processing unit, wherein the error message indicates that the non-secure address is not present, wherein the semiconductor device further includes an encryption unit configured to write the secure contents stored in the secure address in the non-secure address, and the memory path controller further includes:

a second content firewall unit connected with the encryption unit and configured to permit the encrypted secure contents to be written in the non-secure address; and an intermediate connection unit configured to connect the first and second content firewall units and the address region control unit to each other, arrange outputs of the first and second content firewall units and provide the outputs to the address region control unit.

2. The semiconductor device of claim 1, wherein the first content firewall unit receives information from the address region control unit, the information indicating whether an address of the memory in which the first processing unit intends to write the secure contents is the secure address or the non-secure address.

3. The semiconductor device of claim 1, further comprising:

a memory management unit configured to convert a virtual address used by the first processing unit into a physical address.

4. The semiconductor device of claim 3, wherein the memory management unit is connected between the first processing unit and the first content firewall unit, and converts a command based on the virtual address received from the first processing unit into a command based on the physical address and provides the converted command to the first content firewall unit.

5. The semiconductor device of claim 1, wherein the encryption unit provides a write command to the second content firewall unit by encrypting the secure contents when the encryption unit intends to write the secure contents stored in the secure address in the non-secure address.

6. The semiconductor device of claim 1, wherein the address region control unit, the first and second content firewall units, and the encryption unit use a physical address.

7. The semiconductor device of claim 1, wherein the address region control unit permits the encryption unit to access the secure address or the non-secure address.

8. The semiconductor device of claim 1, further comprising:

a second processing unit; and a third content firewall unit connected with the address region control unit and configured to prevent the second processing unit from writing the secure contents in the non-secure address of the memory.

9. The semiconductor device of claim 8, wherein the first processing unit includes a graphic processing unit (GPU) and the second processing unit includes a central processing unit (CPU).

10. The semiconductor device of claim 8, wherein the first processing unit includes a video codec.

11. A semiconductor device, comprising:

a processing unit configured to perform a calculation by using data stored in a memory;

an encryption unit configured to encrypt data stored in the memory; and a memory path controller configured to communicate with the processing unit and the encryption unit and control the memory for the processing unit and the encryption unit to perform the calculation, wherein the memory path controller includes:

an address region control unit configured to divide an address space of the memory to include a secure address and a non-secure address and permit the processing unit and the encryption unit to access the secure address or the non-secure address, and a first content firewall unit connected with the address region control unit, and configured to prevent the processing unit from writing secure contents in the non-secure address when a first command to write the secure contents to the non-secure address is received from the processing unit, and prevent the processing unit from reading secure contents written in the non-secure address, and permit the encryption unit to write encrypted secure contents in the non-secure address, wherein the first content firewall unit transmits an error message to the processing unit in response to receiving the first command to write the secure contents in the non-secure address from the processing unit, wherein the error message indicates that the non-secure address is not present, wherein the memory path controller further includes:

an intermediate connection unit connected between the first content firewall unit and the address region control unit, and configured to arrange outputs of the first content firewall unit and provide the outputs to the address region control unit.

12. The semiconductor device of claim 11, wherein in response to receiving a second command to write the encrypted secure contents in the non-secure address from the encryption unit, the content firewall unit provides the second command to the address region control unit.

13. The semiconductor device of claim 11, further comprising:

a memory management unit configured to convert a virtual address used by the processing unit into a physical address.

14. A semiconductor device, comprising:

a processing unit configured to perform an operation on a memory;

an address region control unit configured to assign addresses of the memory as a secure address or a non-secure address; and a first content firewall unit configured to prevent the processing unit from writing secure contents in the non-secure address of the memory when a command to write the secure contents to the non-secure address is received from the processing unit, and prevent the processing unit from reading secure contents written in the non-secure address, wherein the first content firewall unit transmits an error message to the first processing unit in response to receiving the command to write the secure contents to the non-secure address from the processing unit, wherein the error message indicates that the non-secure address is not present, wherein the semiconductor device further includes:

an encryption unit configured to write the secure contents stored in the secure address in the non-secure address;

a second content firewall unit connected with the encryption unit and configured to permit the encrypted secure contents to be written in the non-secure address; and an intermediate connection unit configured to connect the first and second content firewall units and the address region control unit to each other, arrange outputs of the first and second content firewall units and provide the outputs to the address region control unit.

15. The semiconductor device of claim 14, wherein the secure contents include video data.

* * * * *